Figure 1:
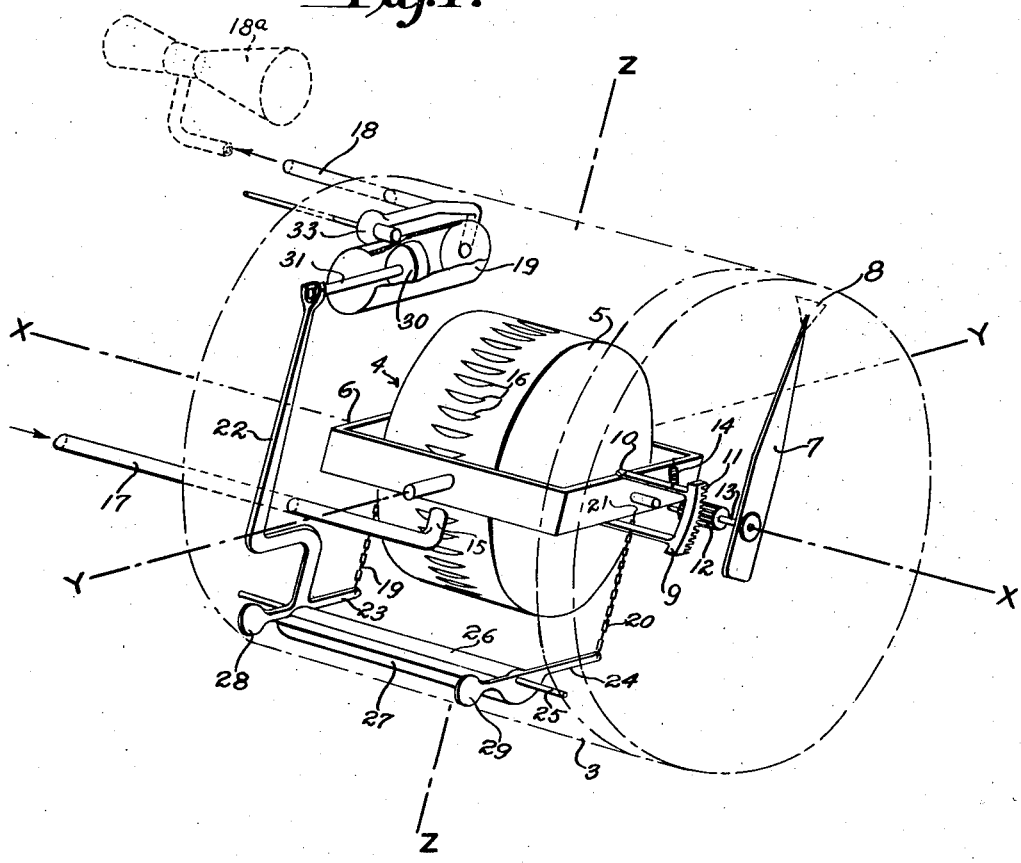

Dec. 18, 1934.    R. CHAPPELL ET AL    1,985,148
MEANS FOR INDICATING ANGULAR MOVEMENTS
Filed Nov. 28, 1930

INVENTORS
Ralph Chappell.
Robert J. Streb.
BY F. B. Smith
ATTORNEY

Patented Dec. 18, 1934

1,985,148

UNITED STATES PATENT OFFICE 1,985,148

MEANS FOR INDICATING ANGULAR MOVEMENTS

Ralph Chappell, Richmond, Va., and Robert J. Streb, Baltimore, Md., assignors to Julien P. Friez & Sons, Inc., Baltimore, Md., a corporation of Maryland Application November 28, 1930, Serial No. 498,898

8 Claims. (Cl. 33—204)

The present invention relates to means for indicating angular movements of a mobile or dirigible object about one of its axes.

One of the objects of the invention is to provide novel means whereby the rate and magnitude of angular movement of a mobile or dirigible object may be indicated.

Another object is to provide novel indicating mechanism of the above type wherein the angular movement of the indicator or pointer is proportional to the rate of angular motion of the object carrying the mechanism.

Another object is to provide in an indicating mechanism of the above type, novel means whereby the restoring force on the sensitive element is proportional to the rate of angular motion, i. e., the force tending to restore the sensitive element to its normal or neutral position increases as the rate of angular motion increases.

A further object is to provide in an indicating mechanism of the above type employing precessional forces of a gyroscope, novel means whereby the gyroscope may be accurately centralized after precession and simultaneously damped to prevent oscillation and to produce steady indications.

Still another object of the invention is to provide in a turn indicating mechanism employing a gyroscope, novel means whereby steady indications are produced when the gyroscope is operating, and whereby fluctuating indications are produced when the gyroscope ceases to operate, thus indicating that the mechanism is inoperative.

The above and other objects and advantages will appear more fully hereinafter from a consideration of the detailed description which follows, together with the accompanying drawing, wherein is illustrated one embodiment of the invention. It is to be expressly understood, however, that the drawing is for the purpose of illustration and description only, and is not to be construed as a definition of the limits of the invention, reference being had for this purpose to the appended claims.

Figure 2:
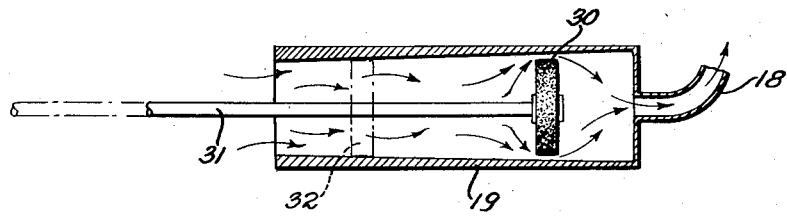

In the drawing, wherein like reference characters refer to like parts in the two views, Fig. 1 is a perspective view, more or less diagrammatic, of one embodiment of the invention; and Fig. 2 is an enlarged longitudinal section of one form of centralizing means employed in accordance with the invention.

Referring to the drawing, the indicating device embodying the invention is of the type including a gyroscope adapted to be rotated about an axis perpendicular to the axis about which turning of the mobile or dirigible object on which the device is mounted is to be indicated and adapted to precess about an axis perpendicular to both of the first mentioned axes, and means for indicating the precessional movements of the gyroscope, which correspond to the angular movements and to the rate of such movements of the dirigible object.

In the form shown, the device comprises an air-tight casing, shown diagrammatically at 3, which may be of any suitable material as, for example, hard rubber or bakelite, and arranged for suitable mounting on the control panel of the dirigible object the angular motion of which is to be indicated, so that the axis Y—Y will coincide with or lie parallel to the longitudinal axis of the object. The gyroscope 4 is mounted in any suitable manner within the casing and includes a rotor 5 journaled in a frame 6 for rotation about the axis X—X, the frame 6 being in turn journaled in the casing 3 in any suitable manner so that the frame may oscillate about the axis Y—Y due to the precessional forces acting thereon when the frame and casing are turned about the axis Z—Z. The rotor and its supporting frame may be arranged in various other positions relative to the longitudinal axis of the casing and hence the axis of the dirigible object, so that angular motion of the object about any one of the three axes may be indicated, as is well understood by those skilled in the art. The device embodying the present invention may be used in an aircraft, for example, to indicate turn, bank or longitudinal inclination.

Means are provided for indicating the precessional movements of the gyroscope about the axis Y—Y, and, in the form shown, comprise a pointer 7 journaled in the casing in any suitable manner (not shown) and adapted to move relative to a fixed mark 8. The precessional movements of the gyroscope frame 6 may be transmitted to the pointer 7 by means of a gear sector 9 secured to the frame as indicated at 10 and arranged so that the teeth 11 mesh with the pinion 12 to which is secured pointer 7 by means of a shaft 13 which is secured to or formed integrally with pinion 12. A spring 14 having one end secured to the frame 6 and its other end to the gear sector 9 is provided for maintaining a positive engagement between the gear sector and the pinion.

Means are provided for rotating the rotor 5 about the axis X—X, and, in the embodiment illustrated diagrammatically, comprise a nozzle 15 arranged to direct a fluid stream into the buckets 16 formed on the periphery of the rotor 5. The source of fluid may be introduced into the casing by means of a pipe 17 and exhausted therefrom through the outlet pipe 18 which is connected to a cylinder 19, the purpose of which will be explained more fully hereinafter.

It is obvious that fluid under pressure for actuating the rotor may be derived in any suitable manner, as by connecting the outlet tube 18 to a Venturi tube 18a, to an exhaust pump (not shown), or to the intake manifold of the internal combustion engine of the vehicle (not shown) on which the device is mounted, whereby the fluid may be drawn into the casing through the tube 17; or the inlet tube 17 may be connected to a compression pump to pump the fluid into the casing and exhaust it through the outlet pipe 18.

It is desirable that the gyroscope be returned to normal position after precessional movement thereof, and that the amount of precession be controlled in accordance with the rate and magnitude of turn of the vehicle on which the instrument is mounted, and to this end novel means are provided for centralizing the gyroscope frame 6 relative to the casing 3 about the axis Y—Y after the vehicle has made a turn. In the form shown, said means comprise a pair of chains 19 and 20 which have one of their ends connected to the opposite sides of the frame 6 as indicated at 21, while the other ends of the chains are connected to a bell crank lever assembly which includes lever 22 and the arms 23 and 24, the latter being connected together by means of a rod 25 passing through a tubular member 26 secured to the casing in any suitable manner, as by means of a bracket 27. The opposite ends of the arms 23 and 24 are counterweighted, as indicated at 28 and 29.

It will be apparent that upon precession of the gyroscope frame 6 about the axis Y—Y in one direction, as for example clockwise, the chain 19 will be pulled taut and the chain 20 slackened, thereby pulling the arm 23 upward; and when the precession is in the opposite direction, or clockwise, chain 20 will in turn be pulled taut and chain 19 slackened to cause the arm 24 to be pulled upward. Since the arms 23 and 24 are connected together by means of the rod 25, the bell crank lever 22 will be actuated in the same direction by either of said arms.

In order to restore frame 6 to its normal position about the axis Y—Y after the precessional movement thereof, means are provided for applying a restoring force to the lever 22 in the opposite direction, said means depending for operation upon the flow of the fluid which drives the gyroscope, and in the embodiment illustrated a piston 30 is arranged for longitudinal movement within the cylinder 19 by the action of said fluid passing therethrough and is connected to the lever 22 by means of a connecting rod 31. The interior surface of the cylinder 19 is formed or tapered inwardly or to the right as indicated in Fig. 2, so that when the frame 6 is in normal position, the piston 30 will be positioned in the large end of the cylinder, thereby permitting the fluid which enters the open end of the cylinder to leak past the piston and into the exhaust pipe 18 as indicated by the arrows. Upon precession of the gyroscope frame in either direction, the piston 30 is pulled outward, or to the left as viewed in Fig. 2, by the action of lever and chain connection described above, thereby decreasing the space between the piston and the cylinder wall and decreasing the leakage of the fluid in accordance with the amount of precession and being moved therein in accordance with the rate of the precessional movement. The taper of the cylinder wall may be so calibrated that the restoring force on the gyroscope is proportional to the force of the fluid pressure which impels the rotor as well as to the rate of precession of the gyroscope due to the rate of turn of the mobile or dirigible object on which the device is mounted, whereby the forces of precession of the gyroscope are made to vary with the rate of turn irrespective of the speed of travel of the vehicle, as for example an aircraft, except in case of a dive of the latter.

It will thus be seen that as the piston 30 is moved more and more to the left by precession of the gyroscope from its normal position, less leakage of the fluid will occur and a greater restoring force will be imparted to the piston 30, so that when the piston is in the extreme left position as indicated in dotted lines at 32, the restoring force is a maximum, and when in the extreme position to the right, that is, when the frame 6 is in the normal central position, the leakage of the fluid is at a maximum, and a minimum restoring force is applied to the piston, which maintains the gyroscope balanced in central position.

The cylinder 19 and piston 30, in addition to their function of centralizing the gyroscope after precession, serve as a dash-pot to dampen the oscillations thereof due to vibration or any other causes, thereby eliminating a separate damping means and simplifying the construction of the indicating device.

A by-pass valve 33 may be provided to pass a portion of the fluid out of the casing without passing through the cylinder and is adjustable whereby sensitivity of the instrument may be controlled.

The operation of the device is as follows: The flow of fluid through the inlet pipe 17 into the casing is directed onto the buckets 16 by means of the nozzle 15 which causes the rotor 5 to be driven thereby. The flow of the fluid out of the casing through the cylinder 19 and around the piston 30 causes the piston to tend to move into the cylinder, whereby a force is exerted on the balanced pivoted bell crank assembly. The bell crank lever 22 pulls on the chains 19 and 20, keeping them under constant tension. It is apparent that this function of the piston 31 and lever 22 acts to produce a centralizing force, causing the pivoted gyroscope frame 6 to assume, with zero turning of the vehicle, a zero position, at which both chains are equally taut under the pull of the piston alone. Under these conditions, the piston is at the inside or larger end of the cylinder and the leak of fluid past the piston is at its maximum.

If now the vehicle is turned, then during the turning there is a force of precession applied through one or the other of the chains to the piston through the bell crank. Which of the chains will be caused to operate will depend on the direction of the turn; that is, whether the gyroscope frame end carrying the gear sector tends to dip down or tip up. In any case, the action will be to pull on one chain and slacken up on the other, thus tending to draw the piston out of the cylinder against the pressure of the fluid passing therethrough. As the piston moves along the cylinder, the fit of the piston against the cylinder wall becomes closer and closer, so that the leak is reduced and the force exerted by the piston becomes greater and greater. Thus an increasing force is applied with increasing precession; that is, greater restoring forces are brought into play to balance the increased forces of precession due to faster turns. It will therefore be seen that the deflection of the pointer 7 due to the precession of the gyroscope frame 6 is made proportional to the rate as well as the magnitude of the turn.

Should the supply of fluid be cut off for any reason, thereby rendering the gyroscope inoperative, then the centralizing forces will also cease. Because of this fact no fluid is entering cylinder 19 and the gyroscope frame 6 will be free to oscillate on the axis Y—Y causing undue oscillation or fluctuation of the pointer 7, thereby indicating that the indicating device is inoperative.

There is thus provided a novel device for indicating the rate as well as the magnitude of the angular movement of a mobile or dirigible object on which the device is mounted, and which is relatively simple in construction and positive in operation.

Novel means are provided whereby the restoring force on the gyroscope is made proportional to the rate of angular motion and by means of which centralization of the gyroscope frame ceases when the gyroscope rotor is rendered inoperative due to a failure in the fluid supply, thereby producing an indication of such failure by undue fluctuations of the pointer.

While only one embodiment of the invention has been illustrated, other changes and modifications will now appear to those skilled in the art and may be made without departing from the scope of the invention. Reference is therefore to be had to the appended claims for a definition of the limits of the invention.

What is claimed is:

1. In a device for indicating the angular motion of a mobile or dirigible object about one of its axes, the combination of an air-tight casing, a gyroscope mounted in said casing for precession in response to said motion, means for introducing a jet of fluid under pressure into said casing and directing it to drive said gyroscope, means for exhausting said fluid from said casing, means for indicating the precession of said gyroscope, and means responsive to said fluid pressure interposed in the path of the exhausted fluid for producing a restoring force in proportion to the rate and magnitude of precession of the gyroscope, and means connecting said responsive means and gyroscope to return the latter to normal position.

2. In a device for indicating the angular motion of a mobile or dirigible object about one of its axes, the combination of an air-tight casing, a gyroscope mounted in said casing for precession in response to said motion, means for introducing a jet of fluid under pressure into said casing and directing it to drive said gyroscope, means for exhausting said fluid from said casing, means for indicating the precession of said gyroscope, means responsive to said fluid pressure interposed in the path of the exhausted fluid for producing a restoring force in proportion to the rate and magnitude of precession of the gyroscope, means connecting said responsive means and gyroscope to return the latter to normal position, and adjustable means for by-passing some of the fluid under pressure to the exterior of the casing, whereby the sensitivity of the device and of the restoring means may be controlled simultaneously.

3. In a device for indicating the angular motion of a mobile or dirigible object about one of its axes, the combination of an air-tight casing, a gyroscope mounted in said casing for precession in response to the angular motion of the object, means for introducing a fluid under pressure into said casing and directing it to drive the gyroscope, means for exhausting said fluid from said casing, fluid pressure responsive means interposed in the path of the exhausted fluid and influenced thereby for producing a force opposing the precession of said gyroscope, means connected to said fluid pressure responsive means for applying said opposing force to said gyroscope for returning the latter to normal position, and means connected to said gyroscope for indicating the precession of the latter in accordance with the rate and magnitude of the angular motion of the object on which the device is mounted, said fluid pressure responsive means being rendered inoperative upon a failure of the fluid pressure, whereby the opposing force is eliminated and the gyroscope is permitted to oscillate freely about its axis of precession so that said indicating means is effective to indicate the inoperation of the device.

4. In a gyroscopic device, means for opposing the precession of the gyroscopic element to centralize the latter about its axis of precession, comprising a cylinder having a tapering inner wall, a piston movable in said cylinder, and means connecting said piston to the gyroscopic element for moving the former upon precession of the latter, said piston and cylinder being so arranged that movement of the piston produces a balancing force on the gyroscope for returning it to normal position after precession.

5. In a gyroscopic device adapted to be driven by fluid under pressure, means responsive to said fluid pressure for opposing the precession of the gyroscopic element of the device, said means comprising a cylinder arranged to pass the fluid under pressure therethrough and having a tapering inner wall, a piston movable in said cylinder and cooperating with the tapered wall to vary the passage of the fluid under pressure through said cylinder, and means connecting said piston to the gyroscopic element for moving said piston upon precession of the gyroscopic element to produce a balancing force for affecting the latter.

6. In combination, an air-tight casing, a gyroscope mounted in said casing for precession about an axis, means for introducing a jet of fluid under pressure into said casing and directing it to drive said gyroscope, means for exhausting said fluid from said casing, and means responsive to said fluid pressure interposed in the path of the exhausted fluid for producing a restoring force in proportion to the rate and magnitude of the precession of the gyroscope, and means connecting said responsive means and said gyroscope to return the latter to normal position.

7. In combination, an air-tight casing, a gyroscope mounted in said casing for precession about an axis, means for introducing a jet of fluid under pressure into said casing and directing it to drive said gyroscope, means for exhausting said fluid from said casing, means responsive to said fluid pressure interposed in the path of the exhausted fluid for producing a restoring force in proportion to the rate and magnitude of precession of the gyroscope, means connecting said responsive means and said gyroscope to return the latter to normal position, and adjustable means for by-passing some of the fluid under pressure to the exterior of the casing, whereby the sensitivity of the device and of the restoring means may be controlled simultaneously.

8. In a gyroscopic turn indicator, a fluid-pressure-driven gyroscope arranged for precession about an axis, a pointer connected to said gyroscope and adapted to be actuated upon precession of the latter, and continuously effective means for opposing the precession of said gyroscope to centralize the latter and for damping the oscillations thereof to produce steady indications of the pointer, said means comprising an interiorly tapered cylinder and a piston, said piston being connected to the gyroscope and arranged to be urged in one direction along the cylinder by the fluid pressure and to be moved in the opposite direction by the precessional movement of the gyroscope in accordance with the amount of said precession whereby upon stoppage of the gyroscope due to a failure of the fluid pressure said gyroscope becomes unrestrained and unbalanced and causes undue oscillations of the pointer, thereby indicating that the turn indicator is inoperative.

RALPH CHAPPELL.
ROBERT J. STREB.